INVENTORS
LEONARD S. BARNISH
IVOR JOHNSON
LESLIE BAINES and
ERIC BOTTOMLEY
By Holcombe Wetherill + Brisebois
ATTORNEYS Jan. 21, 1958　　　L. S. BARNISH ET AL　　　2,820,541
IDLER ROLLERS FOR BELT CONVEYORS
Filed Jan. 10, 1955　　　　　　　　　　　2 Sheets-Sheet 2

INVENTORS
LEONARD S. BARNISH
IVOR JOHNSON
LESLIE BAINES and
ERIC BOTTOMLEY
By Holcombe, Fatherill, Brinston
ATTORNEYS

United States Patent Office 2,820,541
Patented Jan. 21, 1958

2,820,541
IDLER ROLLERS FOR BELT CONVEYORS

Leonard Sinclair Barnish and Leslie Baines, Wakefield, Ivor Johnson, Ossett, and Eric Bottomley, Mapplewell, England, assignors to Richard Sutcliffe Limited, Wakefield, England, a British company Application January 10, 1955, Serial No. 480,932

3 Claims. (Cl. 198—192)

The present invention relates to idler rollers on which the run of a belt conveyor rests, of the type known as hammock idlers which allow the belt to take up a trough shape when under load.

According to the present invention, an idler roller for a belt conveyor comprises a plurality of members, the outer surface of each of which is cylindrical and at least the peripheral portion and a part of the ends of which are resilient, and a flexible axle upon which the said members are mounted coaxially with one another and with the axle so that the resilient portions are in compression axially.

The flexible axle may be made of wire rope and may be attached at each end to a bearing housing within which a shaft is journalled. Preferably means is provided for varying the degree of axial compression of the said members by adjusting the attachment of the rope to the bearing housings.

The said members may each consist of a rigid portion and a separate resilient portion fitting thereon. The rigid portions may be discs having peripheral cylindrical flanges extending on each side of the discs and the resilient portions may be tyres made of a resilient material and fitting on to the flanges.

A hammock idler constructed in accordance with the invention will now be described by way of example in greater detail with reference to the accompanying drawings in which.

Figure 1:
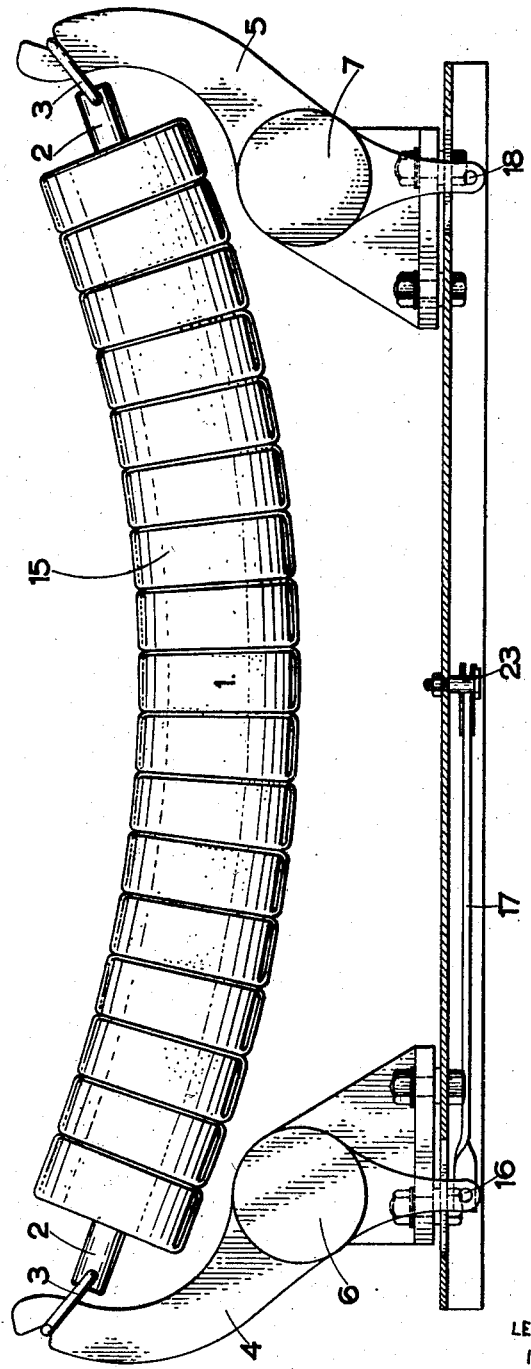
Fig. 1 is a side elevation, showing a base in section on its principal axis.

Referring to Fig. 1, the hammock idler, indicated generally at 1, terminates in short shafts 2 to which are attached links 3 by means of which the idler is suspended between two supporting arms 4 and 5 which are pivotally mounted at 6 and 7, respectively, on a suitable support.

Figure 2:
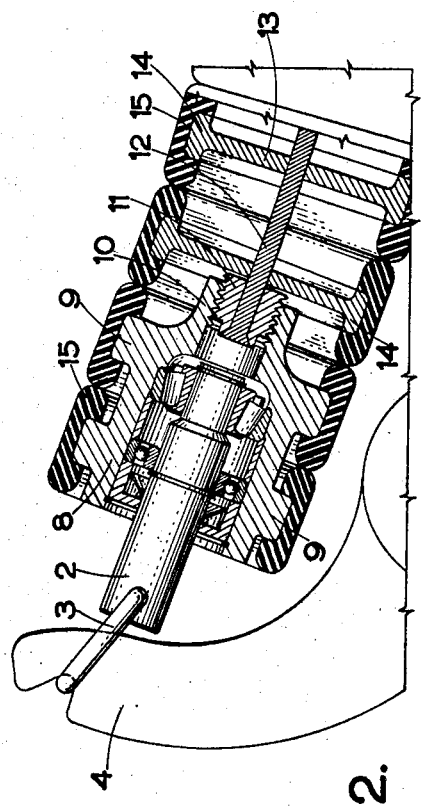
Fig. 2 is a detail side elevation of an end portion of the device, partly in section.

The detailed construction of the idler may be seen from Fig. 2 which shows the left hand end of the idler as shown in Fig. 1 partly in section. The shaft 2 is mounted in a bearing of known type of which the housing is indicated generally at 8. The housing 8 is provided with two projecting circumferential ribs 9 and the right-hand end of the housing as seen in Fig. 2 is in the form of an internally threaded sleeve 10 into which there is screwed an externally threaded block 11.

Fixed to the block 11 is a wire rope 12 which extends throughout the whole length of the idler and is fixed to a similar bearing housing, not shown in detail, at the other end. Mounted on the wire rope 12 are a number of similar discs 13 each of which has a peripheral cylindrical flange 14 extending equally on each side of the disc. The discs 13 may fit either loosely or tightly on to the wire rope 12. Mounted on each of the flanges 14 and on each of the projecting ribs 9 is a rubber tyre 15.

Adjacent rubber tyres 15 bear against one another and thus provide a continuous rubber surface upon which the underside of the upper run of a belt conveyor can rest. Further, the tyres 15 prevent adjacent discs 13 from coming into contact with one another directly and also prevent the outermost discs from coming into contact directly with the bearing housings 8. Thus the resilience of the rubber tyres allows the idler to flex under load so that the portion of the belt resting on it assumes a trough shape.

The degree of flexing of the idler caused by a given load may be regulated by varying the degree of axial compression of the rubber tyres when the idler is not under load. This adjustment is effected by adjusting the position of the block 11 within the sleeve 10. Screwing the block 11 further into the sleeve 10 increases the tension of the wire rope and so increases the axial compression of the rubber tyres. Similarly, screwing the block 11 further out of the sleeve 10 decreases the axial compression of the rubber tyres 15.

Figure 3:
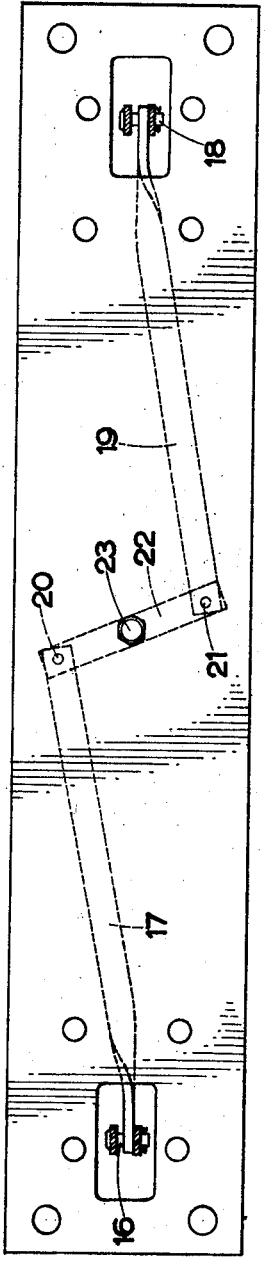
Fig. 3 is a plan view of a base.

The supporting arms 4 and 5 are connected at their lower ends by a linkage the details of which can be seen from Figs. 1 and 3. The supporting arm 4 is pivotally connected at its lower end by a horizontal pivot pin 16 to the outer end of a link 17 and the supporting arm 5 is pivotally connected at its lower end by a horizontal pivot pin 18 to the outer end of a link 19. The inner ends of the links 17 and 19 are pivotally connected at 20 and 21 respectively to opposite ends of an arm 22 which is pivotally mounted at its centre on a vertical pin 23. This linkage ensures that, when a load is applied to the idler causing it to sag, the supporting arms pivot inwardly through equal angles. The pivots 6 and 7 incorporate rubber bushings which cause the arms 4 and 5 to move outwardly again to their initial position when the load is removed.

The tyres 15 may be made of any other suitable resilient material instead of rubber on the separate discs 13 and tyres 15 may be replaced by members made up of rubber bonded to metal. Alternatively, the discs and tyres may be replaced by cylinders made of rubber or some other suitable resilient material.

We claim:

1. An idler roller for a belt conveyor comprising a plurality of members, the outer surface of each of which is cylindrical and at least the peripheral portion and a part of the ends of which are resilient, a flexible axle upon which the said members are mounted coaxially with one another and with the axle and so that the resilient portions of adjacent members are in contact with one another and in compression axially, two bearing housings attached one to each end of the axle and each having a resilient portion which bears against a resilient portion of the outermost member adjacent to it, two shafts rotatably mounted one in each of the bearing housings, and supporting means for said shafts.

2. An idler roller for a belt conveyor as claimed in claim 1 in which the resilient portion of each bearing housing comprises a rubber tyre fitted on to a circumferential projecting rib.

3. An idler roller for a belt conveyor as claimed in claim 1 in which the said members fit loosely on the axle, and in which means is provided for varying the degree of axial compression of the resilient portions of the said members by adjusting the attachment of the axle to the bearing housings.

References Cited in the file of this patent

UNITED STATES PATENTS

| | | |
|---|---|---|
| 283,356 | Painter | Aug. 14, 1883 |
| 2,698,077 | Baechli | Dec. 28, 1954 |

FOREIGN PATENTS

| | | |
|---|---|---|
| 744,915 | Germany | Jan. 29, 1944 |